US012595824B2

(12) United States Patent
Köching

(10) Patent No.: US 12,595,824 B2
(45) Date of Patent: Apr. 7, 2026

(54) PLAIN BEARING ASSEMBLY HAVING A RAIL AND A SLIDE

(71) Applicant: igus SE & Co. KG, Cologne (DE)

(72) Inventor: Fabian Köching, Rhede (DE)

( * ) Notice: Subject to any disclaimer, the term of this patent is extended or adjusted under 35 U.S.C. 154(b) by 0 days.

(21) Appl. No.: 18/286,114

(22) PCT Filed: Apr. 8, 2022

(86) PCT No.: PCT/EP2022/059515
§ 371 (c)(1),
(2) Date: Oct. 17, 2023

(87) PCT Pub. No.: WO2022/218875
PCT Pub. Date: Oct. 20, 2022

(65) Prior Publication Data
US 2024/0191748 A1 Jun. 13, 2024

(30) Foreign Application Priority Data

Apr. 12, 2021 (DE) ..................... 20 2021 101 946.8

(51) Int. Cl.
*F16C 29/02* (2006.01)
*F16C 29/00* (2006.01)
(52) U.S. Cl.
CPC ............ *F16C 29/02* (2013.01); *F16C 29/005* (2013.01); *F16C 2208/02* (2013.01); *F16C 2220/04* (2013.01)
(58) Field of Classification Search
CPC ...... F16C 29/005; F16C 29/007; F16C 29/02; F16C 2220/04
See application file for complete search history.

(56) References Cited

U.S. PATENT DOCUMENTS 6,113,275 A * 9/2000 Blase ...................... F16C 33/20
384/42
6,179,468 B1 * 1/2001 Thorstens ............... F16C 29/02
384/40

(Continued)

FOREIGN PATENT DOCUMENTS

CN 103398098 A 11/2013
DE 103 56 727 A1 7/2005
(Continued)

OTHER PUBLICATIONS

The International Bureau of WIPO, English translation of the International Preliminary Report on Patentability for PCT App. No. PCT/EP2022/059515, Apr. 12, 2023, pp. 1-6.

(Continued)

*Primary Examiner* — James Pilkington
(74) *Attorney, Agent, or Firm* — Cahn & Samuels, LLP

(57) ABSTRACT

A plain bearing assembly (1) includes a rail and a carriage (20). The rail has a rail body (10) elongate in a longitudinal direction and on one transverse side there is a cylindrical guide portion (11). The carriage (20) includes a carriage body with a cylindrical passage (22) corresponding to the guide portion (11) to receive the guide portion (11). The inner side of the passage (22), with which, in an operating state of the plain bearing assembly, the carriage (20) rests slidingly in the longitudinal direction against the guide portion (11), is formed by a sliding element made from a sliding material. The sliding element is produced jointly with the carriage body as a one-piece carriage part made of plastics material.

15 Claims, 4 Drawing Sheets

(56) References Cited

U.S. PATENT DOCUMENTS

Figure 1:
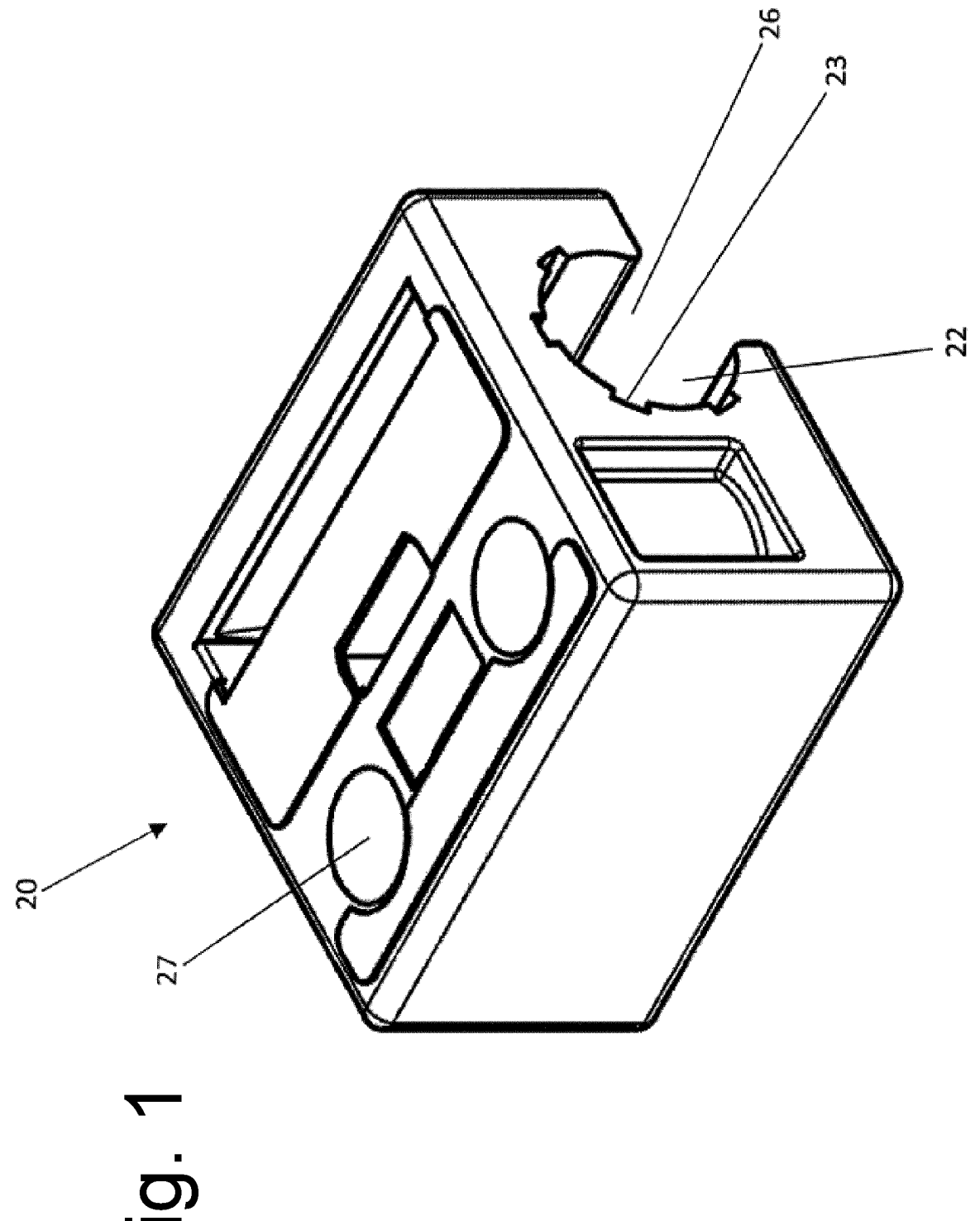

| | | | | |
|---|---|---|---|---|
| 7,207,432 B2 * | 4/2007 | Hama | .................... | B23Q 1/017 |
| | | | | 384/40 |
| 7,217,034 B2 | 5/2007 | Moshammer | | |
| 11,530,719 B2 * | 12/2022 | Niermann | ............. | G01M 13/04 |
| 2006/0083447 A1 | 4/2006 | Moshammer | | |
| 2019/0145462 A1 | 5/2019 | Jansa et al. | | |

FOREIGN PATENT DOCUMENTS

| | | |
|---|---|---|
| DE | 20 2004 016 094 U1 | 3/2006 |
| DE | 20 2016 106 594 U1 | 1/2017 |
| DE | 10 2016 201 875 A1 | 8/2017 |
| DE | 20 2018 105 755 U1 | 12/2019 |
| JP | 200961701 A | 3/2009 |
| WO | 2020074536 A1 | 4/2020 |

OTHER PUBLICATIONS

European Patent Office, International Search Report for PCT App. No. PCT/EP2022/059515, Jul. 15, 2022, pp. 1-3.

European Patent Office, Written Opinion for PCT App. No. PCT/EP2022/059515, Jul. 15, 2022, pp. 1-6.

European Patent Office, International Preliminary Report on Patentability for PCT App. No. PCT/EP2022/059515, Apr. 8, 2022, pp. 1-21.

Deutsches Patent-und Markenamt, Search Report for DE App. No. 20 2021 101 946.8, Nov. 9, 2021, pp. 1-8.

European Patent Office, Espacenet, English abstract for DE 103 56 727 A1, printed on Sep. 20, 2023.

European Patent Office, Espacenet, English abstract for DE 10 2016 201 875 A1, printed on Sep. 20, 2023.

European Patent Office, Espacenet, English abstract for DE 20 2016 106 594 U1, printed on Sep. 20, 2023.

European Patent Office, Espacenet, English abstract for DE 20 2018 105 755 U1, printed on Sep. 20, 2023.

Japan Patent Office, Notification of Reasons for Rejection for Patent Application No. 2023-561849, Apr. 30, 2025. pp. 1-5.

European Patent Office, Espacenet, English Abstract for JP200961701A, retrieved May 22, 2025. p. 1.

Korean Intellectual Property Office, Notice of Submission of Opinion for Patent Application No. 10-2023-7039008, May 19, 2025, pp. 1-7.

Taiwan Intellectual Property Office, examination report in TW App. No. 111113792, Dec. 15, 2025, pp. 1-17.

* cited by examiner

Fig. 4

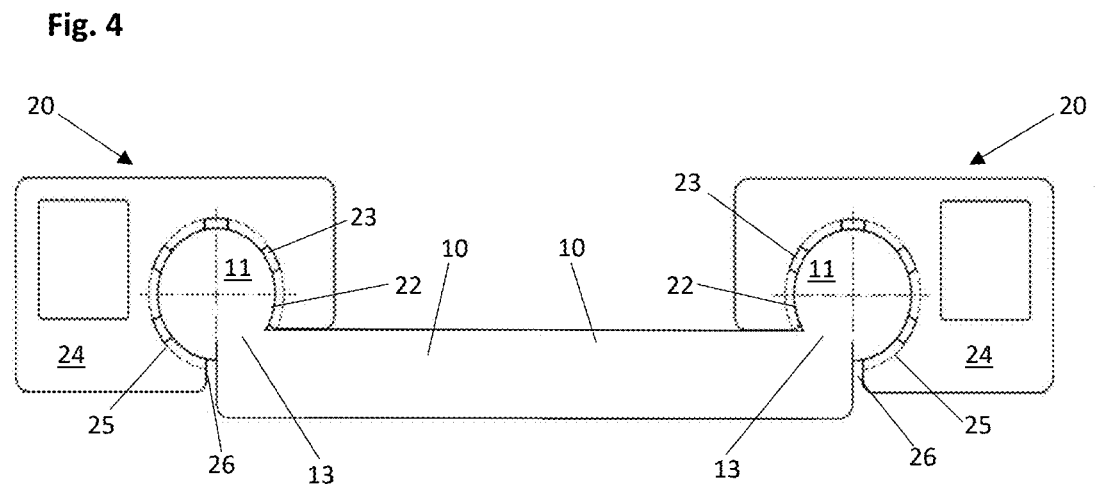

PLAIN BEARING ASSEMBLY HAVING A RAIL AND A SLIDE

I. FIELD OF THE INVENTION

The invention relates to a plain bearing assembly comprising a substantially straight rail and a carriage displaceable thereon in the longitudinal direction of the rail, which carriage is guided on the rail by a guide portion, and to the carriage of such a plain bearing assembly and to a method for producing such a carriage.

II. BACKGROUND OF THE INVENTION

Such a plain bearing assembly is required wherever a mechanical element needs to be moved along a substantially straight line with the least possible expenditure of time and energy, for example in the fields of automated manufacture, materials processing machines, measuring machines, medical technology, filling and packaging. Surfaces of a guiding component (rail) here slide on surfaces of the moving guided component (carriage), preferably without additional lubricants. It goes without saying that the guiding component or rail is significantly longer in the longitudinal direction than the guided component or carriage, so that a practical arrangement is obtained, wherein this can for instance conventionally be ensured by the rail having a lengthwise extent in the longitudinal direction which is at least five times the lengthwise extent of the carriage in the longitudinal direction. In an intended use, the rail is usually fixed by a fixing side, which is in particular a side remote from the carriage, to a device, for example a wall or a machine, while the carriage, linearly guided by the rail, is mobile relative to the rail and thus relative to the device. The fixing side conventionally has a planar surface portion which is configured to rest against the device in said intended use. The planar surface portion may be continuous or have mutually spaced subportions; the planar surface portion preferably constitutes at least 50% of the area of the fixing side. The rail conventionally has a cylindrical guide portion which is offset relative to the fixing side. The sliding surface material pairings used are usually metal-plastics material or plastics material-plastics material. Linear plain bearing assemblies have frequently proven to be an advantageous alternative to linear ball bearings. In generic plain bearing assemblies, the carriage conventionally has a mounting side on which a working device, for example a machine component to be moved linearly in a longitudinal direction, is intended to be arranged and fastened. A fastening channel, which runs through the carriage body perpendicularly to the longitudinal direction, preferably opens into the mounting side, wherein a fastening means, for example a screw, can be guided through the fastening channel, which screw, on intended use of the plain bearing assembly, presses with its screw head against a side of the carriage body opposite the mounting side and is screwed into the working device. The mounting side preferably has a planar mounting surface into which the fastening channel preferably opens. The carriage is frequently substantially cuboidal, wherein one of the sides of the cuboidal carriage is configured as the mounting side. A passage running in the longitudinal direction through the carriage body is provided in the carriage body for receiving a cylindrical guide portion of the rail. In a cuboidal configuration of the carriage, the passage preferably runs parallel to four of the six sides of the cuboid or at least to the preferably provided planar mounting surface and in particular perpendicular to the fastening channel, wherein the fastening channel is offset in a transverse direction to the passage and thus spaced from the passage.

Plain bearing assemblies with rails and carriages made from metal are known, wherein a passage for receiving a guide portion of the rail runs through the body of the carriage, the inner surface of which passage is formed by a sliding element of plastics material. DE 20 2018 105 755 U1 discloses an example of such a sliding element in a plain bearing assembly. Similar plain bearing assemblies composed of rails and carriages are distributed by the applicant under the trade name Drylin®. The carriage bodies may here be made from die-cast zinc, aluminum or stainless steel. A special sliding material is provided for the sliding elements. The sliding element rests against the carriage body, forming the passage. The carriage body accordingly has a passage channel in which the sliding element and passage are arranged, wherein the sliding element rests against the inner side of the passage channel. Manufacturing such plain bearing assemblies involves commensurate effort to produce and assemble the various components.

When considering energy consumption and wear during the operation of such plain bearing assemblies, it should be borne in mind that the carriage connected to the element to be displaced is merely an auxiliary means. In particular, if its mass constitutes a significant proportion of the overall displaced mass, it is also responsible for a significant proportion of the energy consumption, for example for acceleration and deceleration, and also for the surface pressure of the sliding surfaces, which is decisive for wear.

Known plain bearing assemblies exhibit an inevitable degree of wear of the sliding element. If this is not noticed in good time, metal-metal contact may occur with correspondingly more severe friction and damage to the carriage body. In this case, the carriage must be uninstalled and the worn sliding element, and under certain circumstances also the damaged metal carriage body, replaced. Depending on how often this happens, the productivity of the corresponding process is impaired.

A plain bearing assembly known from DE 20 2004 016 094 U1. Further prior art is known from US 2019/145462 A1.

III. SUMMARY OF THE INVENTION

It is an object of the present invention to provide a plain bearing assembly and a carriage which at least in part overcome(s) at least one disadvantage of generic plain bearing assemblies, with in particular energy consumption and wear being reduced and productivity improved.

As one way of achieving the object underlying the invention, the invention proposes a plain bearing assembly having the features described below.

The plain bearing assembly according to the invention comprises a rail and a carriage. The rail has a rail body elongate in a longitudinal direction, at one transverse side of which is provided a cylindrical guide portion which is connected to the rail body via a neck portion of the rail. The transverse side is a side running in the longitudinal direction and bounding the rail body in a transverse direction perpendicular to the longitudinal direction. The carriage has a carriage body through which there runs a cylindrical passage corresponding to the guide portion and intended for receiving the guide portion. The carriage body has a longitudinal slot for receiving the neck portion, which slot is connected to the passage and corresponds to the neck portion. The carriage body is preferably cuboid in configuration. In the intended state of the plain bearing assembly, the neck thus extends, starting from the guide portion arranged in the passage, through the longitudinal slot to the rail body. The rail body is preferably formed in a shape like a cuboid. The guide portion is preferably arranged at one edge of the cuboidal rail body. Thanks to the provision of the passage and of the longitudinal slot connected to the passage, the carriage can be slid in the longitudinal direction along the rail, while the guide portion is arranged in the passage and slides along in the passage on the carriage and the neck portion is arranged in the longitudinal slot and, positioned in the longitudinal slot, is displaced relative the carriage. The inner side of the passage with which, in the intended operating state of the plain bearing assembly, the carriage rests slidingly in the longitudinal direction against the guide portion, is formed by a sliding element made from a sliding material. According to the invention, the carriage body is produced jointly with the sliding element as a one-piece carriage part of plastics material, wherein at least the inner side of the passage is formed by a tribopolymer and wherein preferably at least 80 vol. % of the carriage part, i.e., at least 80% of the volume of the carriage part formed by the carriage body and the sliding element, is provided with fiber reinforcement. The plastics material is preferably a polymeric plastics material, the plastics material preferably being sliding material. The entire carriage is particularly preferably produced in one piece, in particular in a continuous production step, of plastics material. The carriage as a whole is particularly preferably produced throughout from one and the same plastics material, in particular from a tribopolymer. The carriage part can be divided into a carriage body region and a sliding element region. The sliding element region is that carriage part region which forms the inner side of the passage and extends starting from the inner side over a layer thickness projecting from the inner side into the carriage part which preferably amounts to 0.5 mm to 2 mm. The carriage part preferably consists of the carriage body region and the sliding element region. Longitudinal grooves or flutes, which preferably run in the longitudinal direction, are preferably formed on the inner side of the passage so that, in the intended operating state, the contact surface of the carriage or sliding element on the guide portion can be reduced and in particular any increase in friction due to soiling can as far as possible be prevented. The sliding element region is preferably defined by the groove walls. The sliding element region is provided as the region in which, as intended, sliding friction between the carriage and the guide portion of the rail is expected even in the event of wear.

A sliding material for producing the carriage according to the invention should be taken to mean thermoplastic polymers with a low coefficient of friction for static and sliding friction against metal and plastics material surfaces such as polyethylene, polyoxymethylene (polyacetal), polypropylene, polyvinyl chloride, polyethylene terephthalate, and also thermosetting polymers such as epoxy resins. Friction and wear can be further reduced by adding suitable lubricants, for example silicone oils or fluorinated ethylene polymers, to these matrix polymers. Depending on their nature, these lubricants may not only be homogeneously blended with or dissolved in the matrix polymer but also incorporated as a finely divided heterogeneous phase. In the latter case, the particle size of the heterogeneous phase conveniently amounts to 0.01-10 μm.

A further reduction in friction and wear is achieved by incorporating finely divided solid lubricants into described sliding materials, alone or in combination with the above-stated lubricants. Such materials are here denoted tribopolymers. Solids with a crystalline multilayer structure such as graphite, molybdenum disulfide, molybdenum trioxide, tungsten disulfide, (hexagonal) alpha-boron nitride and intercalation compounds of these substances are suitable for this purpose. Inorganic compounds such as calcium fluoride and cerium fluoride may also be considered. The particle size of the solid lubricants is conveniently between 0.01 and 50 μm. Fibers may be incorporated into the sliding material, in particular a sliding material in the form of a tribopolymer, for reinforcement. Fiber reinforcement should be taken to mean the introduction of suitable fibers into the matrix polymer. These fibers consist of suitable materials with sufficient strength and a sufficiently good bond to the matrix polymer. Suitable fibers are, for example, made from glass, carbon, aramid, polyester or polyamide. With regard to processability, the length of these fibers is preferably 0.1-10 mm. Fiber diameter is conveniently between 5 and 25 μm and the fiber content in the material provided with fiber reinforcement is conveniently between 5 and 50 percent by volume.

The rail of the plain bearing assembly according to the invention has a cylindrical guide portion which is connected to the rail body via a neck portion. The length and thickness of this neck portion is determined by the specific geometry of the surroundings and the required stability. The neck portion can in general be integrated in the rail body and denotes the transition from the rail body to the guide portion. In any event, the cylindrical passage must have a longitudinal slot in which the neck portion can be moved in the longitudinal direction and the neck portion extending through the longitudinal slot connects the guide portion to the rail body. The width of the longitudinal slot is determined by the thickness of the neck portion. The latter is preferably dimensioned such that the longitudinal slot has less than one quarter of the circumference of the passage.

The carriage according to the invention of the plain bearing assembly thus now no longer consists of two components, which have to be connected during installation, but instead of one component, the carriage part, which integrates the characteristics of the carriage body and sliding element where they are important. These are namely firstly the inner surface of the passage, where low friction and high wear resistance are important, and secondly the carriage body, which must have sufficient strength and preferably low mass to be capable of carrying the mechanical elements fastened thereto in operation. The characterizing features of the main claim take this necessity into account. Accordingly, on the carriage according to the invention, the sliding element region is approximately 0.5-5 mm thick and, adjoining the inner surface of the passage, is to be distinguished from the carriage body region, which corresponds to the reduced volume of the carriage around the sliding element region.

The rail of the plain bearing assembly according to the invention is preferably adapted to be fastened to a substructure or supporting structure. Holes, through which screws are screwed into the substructure, may for example be provided for this purpose.

In a preferred embodiment, the entire carriage is uniformly made from a sliding material. In this case, this would preferably be a tribopolymer also comprising fiber reinforcement. This simplifies the production process.

In one embodiment, the carriage body region has a higher fiber content than the sliding element region. The percentage by volume of fibers provided in the carriage part, which are provided to reinforce the plastics material from which the carriage part is produced, thus preferably varies over the volume of the carriage part. The fiber content per unit volume of the plastics material forming the inner side is lower on the inner side of the passage than in a carriage part region spaced at least 5 mm from the passage. Preferably, on the inner side of the passage, no fibers are provided in the plastics material constituting the inner side of the passage.

In one embodiment, the rail has a second guide portion mounted on its other transverse side. In this way, two different transport tasks can be performed with one plain bearing assembly, or a carriage may be used which has two matching passages and so obtains a higher load-carrying capacity and improved stability during displacement. The passages may be configured or embodied as explained for the one passage, in particular the entire carriage with two passages can be configured as a one-piece carriage part.

Continuous longitudinal grooves or flutes are advantageously provided on the inner side of the passage. This reduces the sliding surface and potentially friction.

The guide portion is preferably made in one-piece with the rail body. It is, however, also possible to produce the guide portion just with the neck and then to fasten it to the rail body if this seems convenient.

The guide portion and optionally the rail body, preferably the entire rail, preferably consist of a metal or a metal alloy, preferably aluminum or the alloys thereof, titanium or the alloys thereof, or magnesium or the alloys thereof. The alloy components are preferably selected such that they increase strength and resistance to wear and optionally corrosion.

The invention also provides methods for producing a carriage for the plain bearing assembly according to the invention. The carriage part is preferably produced using an injection molding method. In one embodiment, a suitable matrix polymer, i.e., base polymer, is to this end blended with the desired additives, lubricant and/or solid lubricant, and in particular the fibers, for example in an extruder, and injected into an injection mold. After cooling, the carriage part can then be removed from the mold as a molded part.

In order to obtain a maximally homogeneous distribution of the additives in the matrix polymer, it is convenient not to use the pure additives, but instead premixes thereof prepared with respective proportions of the matrix polymer, for the final mixture.

In an embodiment of the carriage according to the invention with different materials in the carriage body region and sliding element region, a two-component injection molding method is preferably used accordingly. To this end, a component A comprising the matrix polymer, fibers and optionally lubricant is first formulated for the carriage body region and a component B for the sliding element region including the corresponding matrix polymer and the solid lubricant. These two components are then processed in a two-component injection molding method. Not only "insert injection molding", in which a part, for example the sliding element made of component B, is prefabricated and inserted into the mold for the entire carriage, which mold is then filled with component A, but also methods involving displaceable mold parts or co-injection may be used for this purpose. What is important is that fusion proceeds at the interface between the two components to form the one-piece carriage. For this purpose, compatible matrix polymers, preferably the same polymer, should be used in the two components.

In general, in the method according to the invention for producing the carriage, components are preferably processed in a multicomponent injection molding method in such a way that the solid lubricants and/or lubricants are concentrated on the inner side of the passage and the reinforcing fibers in the carriage body are concentrated away from the inner side of the passage. By using such a method, different carriage part properties can be obtained in different regions of the carriage part directly in the production process.

The invention further relates to a carriage for a plain bearing assembly according to the invention. The carriage is produced as a one-piece carriage part of plastics material, which carriage part has integrated therein a carriage body and a sliding element produced from a sliding material. A cylindrical passage corresponding to a cylindrical guide portion of a rail which comprises, in addition to the cylindrical guide portion, a rail body connected to the guide portion via a neck portion likewise comprised by the rail, is provided in the carriage body for receiving the guide portion. The carriage body has a longitudinal slot for receiving the neck portion of the rail, which slot is connected to the passage and corresponds to the neck portion. The inner side of the passage, with which, in an intended operating state of the plain bearing assembly, i.e., in the case of an intended use of the carriage, the carriage rests slidingly in the longitudinal direction against the guide portion, is formed by a sliding element. The carriage according to the invention preferably has a width of 20 mm to 40 mm, in particular 20 mm to 30 mm, a length of 20 mm to 50 mm, in particular 25 mm to 35 mm and a height of 10 mm to 25 mm, in particular 12 mm to 20 mm and weighs less than 20 g, in particular less than 15 g, in particular less than 12 g. The passage preferably has a diameter, i.e., a distance between two radially opposite sliding contact surfaces formed by the inner side to rest against the guide portion during intended use, of 8 to 15 mm, in particular 8 to 12 mm. In particular, in combination with at least some of the above-stated properties, the carriage at the same time has a static load-carrying capacity of at least 20 N, in particular at least 25 N, in at least one load direction. The static load-carrying capacity is a load-carrying capacity with which the carriage can be loaded in the load direction while a corresponding guide portion is received in the passage thereof, wherein the carriage loaded with a corresponding load can be slid non-destructively on the rail in the longitudinal direction, while the guide portion of the rail is arranged in the passage thereof and the guide portion of the rail rests slidingly against the inner side of the passage, wherein the carriage transfers the load applied in the load direction and thus force onto the guide portion of the rail.

The carriage according to the invention, the plain bearing assembly according to the invention and the method according to the invention may in each case have features which are described in various embodiments according to the invention relating to the various solutions according to the invention. The various embodiments according to the invention may furthermore also have features which are described in connection with generic embodiments.

Although not preferred, it is also possible to manufacture the carriage body and sliding element separately and then connect them firmly together, for example by adhesive bonding or welding.

The plain bearing assembly according to the invention is distinguished by a lower mass to be displaced, such that energy input is lower and/or the cycle rate on manufacturing lines can be increased. Moreover, replacing the carriage during maintenance is easier because only one part is replaced and maintenance intervals can be extended due to reduced wear. Since the carriage body is now made of sliding material, good emergency running properties are still obtained in the event of wear to the sliding element region and unforeseen failure is avoided. It is also possible to dispense with the use of additional lubricant. The carriage is now completely metal-free and can be effectively recycled.

Noise generation during operation is lower due to the lower mass and contamination of the surroundings with abraded metal is ruled out.

IV. BRIEF DESCRIPTION OF THE DRAWINGS

Figure 2:
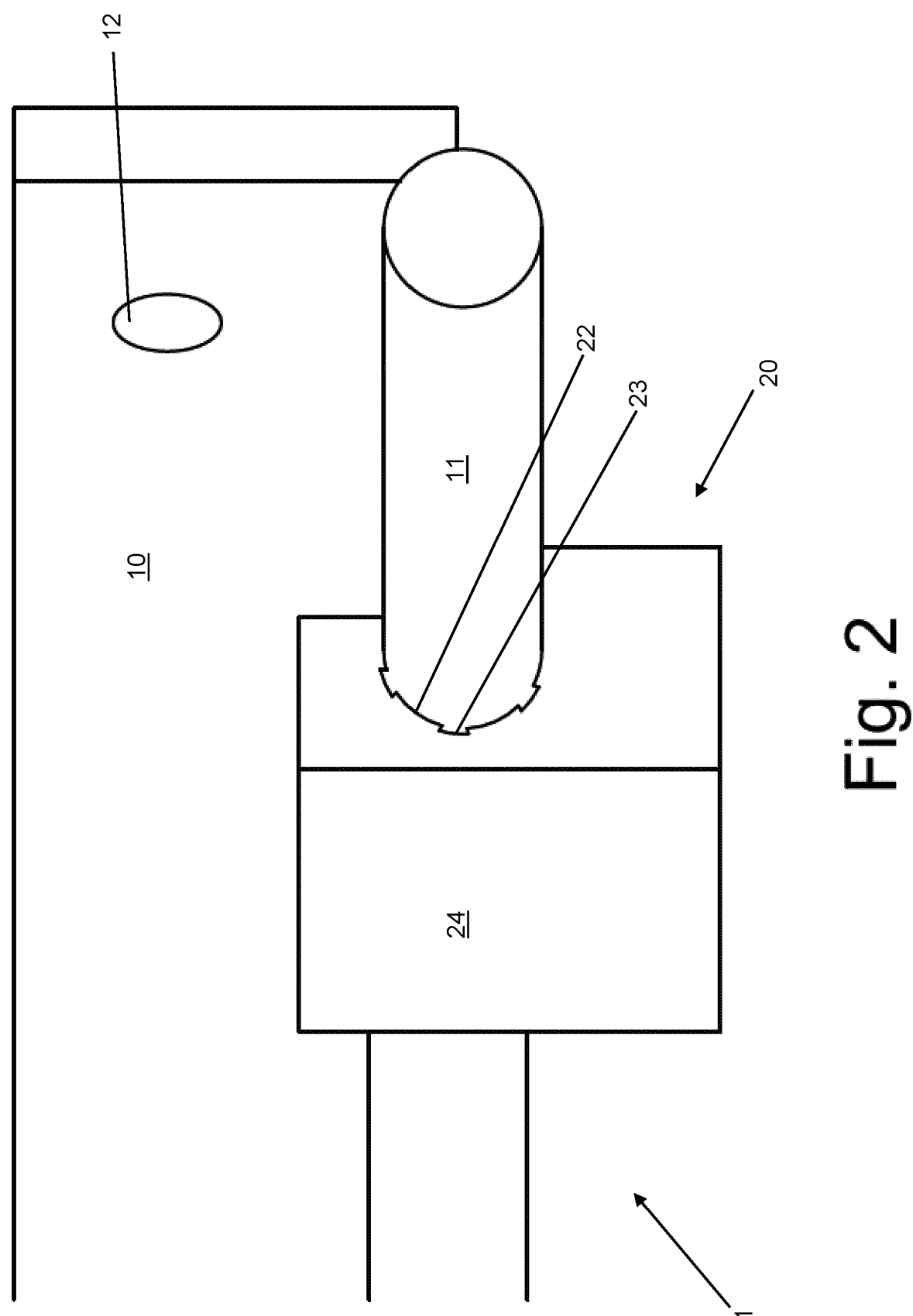
Figure 3:
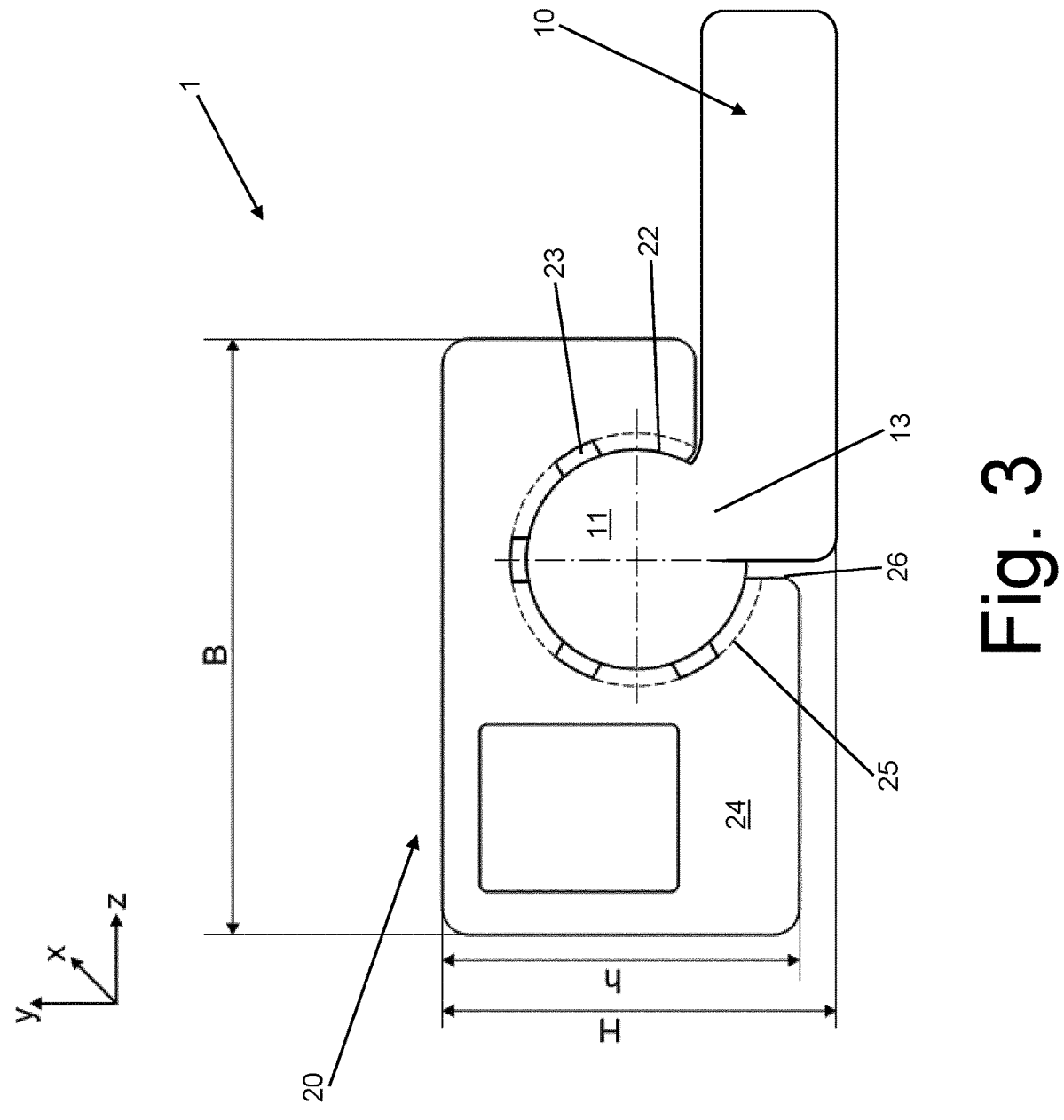

The invention will now be explained in greater detail with reference to an exemplary embodiment on the basis of drawings, in which:

FIG. 1: is a schematic diagram of one embodiment of a carriage according to the invention;

FIG. 2: is a schematic diagram of an oblique view of one embodiment of a plain bearing assembly according to the invention;

FIG. 3: is a schematic diagram of a side view of the embodiment according to FIG. 2.

V. DETAILED DESCRIPTION OF THE INVENTION

FIG. 1 shows an oblique view of one embodiment of a carriage 20 according to the invention. It is apparent from FIG. 1 that the carriage 20 has a cuboidal carriage body through which a passage 22 extends. The passage 22 is configured in the manner of a cylinder, the cylinder axis of which extends in the longitudinal direction. The carriage body furthermore has a longitudinal slot 26 which is connected to the passage 22. FIG. 3 in particular shows that, in the intended state of a sliding assembly 1 according to the invention, the neck portion 13 of a rail passes through the longitudinal slot 26, which neck portion is connected on the one hand to the guide portion 11 arranged in the passage 22 and on the other hand to the rail body 10 configured for mounting on a component. The cylinder axis of the passage 22 extends parallel to four of the six rectangular faces of the cuboid which substantially constitutes the carriage body. The carriage 20 has a mounting side, which in FIG. 1 faces upward, through which two fastening channels 27 extend, such that a working device can be fastened to the mounting side of the carriage by fastening means, for example screws, which are passed through the fastening channels 27. FIG. 1 furthermore shows that the carriage as a whole takes the form of a one-piece carriage part which integrally forms a sliding element on the inner side of the passage. Longitudinal grooves 23 are provided on the inner side of the passage. The groove depth, which extends radially relative to the cylinder axis of the passage 22, defines the sliding element region, i.e., the region in which, during intended use of the carriage 20, even in the case of wear, frictional contact is provided between the carriage and the guide portion of the rails arranged in the passage 22.

FIG. 2 shows an oblique plan view of the plain bearing assembly 1 according to the invention. The rail body 10 of the rail with the guide portion 11 mounted thereon can be seen. The rail body 10 is preferably adapted to be fastened to a substructure or supporting structure. Screw holes 12, through which screws are screwed into the substructure, may for example be provided for this purpose. The carriage 20 is slipped slidably onto the guide portion, wherein the cylindrical passage 22 receives the guide portion 11 of the rail. Longitudinal grooves 23 are let into the inner surface of the passage 22 in order to reduce the contact area and friction.

FIG. 3 shows a side view of the slide rail assembly. The dimension lines relate to the exemplary embodiment described below. The rail with the rail body 10 and the guide portion 11, which are connected together by the neck portion

13, can again be seen. The neck portion 13 extends through the longitudinal slot 26 in the cylindrical passage 22 and occupies less than one quarter of the entire circumference of the passage. The sliding element region 25 is here shown as part of the carriage 20 and occupies about 0.5-5 mm of the volume of the carriage surrounding the passage 22. The remainder of the carriage forms the carriage body region 24.

LIST OF REFERENCE SIGNS

1 Plain bearing assembly
10 Rail body
11 Guide portion
12 Screw hole
13 Neck portion
20 Carriage
22 Cylindrical passage
23 Longitudinal grooves
24 Carriage body region
25 Sliding element region
26 Longitudinal slot

The invention claimed is:

1. A plain bearing assembly (1) comprising a rail and a carriage (20), wherein the rail has a rail body (10) elongated in a longitudinal direction, the rail body (10) having a transverse side running in the longitudinal direction and bounding the rail body in a transverse direction, the transverse direction being perpendicular to the longitudinal direction, wherein a cylindrical guide portion (11) is provided at the transverse side of the rail body, the cylindrical guide portion being connected to the rail body (10) via a neck portion of the rail, wherein the carriage (20) has a carriage body region in which a cylindrical passage (22) corresponding to the cylindrical guide portion (11) is provided for receiving the cylindrical guide portion (11), the carriage (20) having a mounting side for mounting a machine component, which is to be moved along the rail body (10) in the longitudinal direction, and the carriage (20) having a fastening channel which runs through the carriage body region perpendicularly to the longitudinal direction and opens into the mounting side, wherein the fastening channel is spaced from the cylindrical passage (22) by an offset in the transverse direction, wherein the carriage body region has a longitudinal slot (26) for receiving the neck portion (13), the slot (26) is connected to the cylindrical passage (22), wherein an inner side of the cylindrical passage (22) is formed by a sliding element region, with which, in an operating state of the plain bearing assembly, the carriage (20) rests slidingly in the longitudinal direction against the cylindrical guide portion (11), wherein at least a portion of the carriage (20) comprising the carriage body region and the sliding element region is produced in one piece of a plastic sliding material, the plastic sliding material being a tribopolymer-.

2. The plain bearing assembly (1) according to claim 1, wherein at least 80 volume percent of the carriage includes a fiber reinforcement and wherein the carriage body region (24) has a higher fiber content than the sliding element region (25).

3. The plain bearing assembly (1) according to claim 1, wherein the cylindrical guide portion and a second cylindrical guide portion (11) are provided on two transverse sides of the rail body (10), wherein the assembly comprises two carriages (20) each with one cylindrical passage (22) or one carriage (20) with two cylindrical passages (22), wherein the cylindrical guide portions (11) are received in the cylindrical passages (22).

4. The plain bearing assembly (1) according to claim 1, wherein the inner side of the cylindrical passage (22) includes longitudinal grooves.

5. The plain bearing assembly (1) according to claim 1, wherein the cylindrical passage (22) encloses the cylindrical guide portion (11) over at least three quarter of the circumference thereof.

6. The plain bearing assembly (1) according to claim 1, wherein the cylindrical guide portion (11) is produced from a metal, a metal alloy, aluminum or the alloys thereof, titanium or the alloys thereof, magnesium or the alloys thereof, or stainless steel.

7. The plain bearing assembly (1) according to claim 1, wherein the cylindrical guide portion (11) is produced from a metal or a metal alloy.

8. The plain bearing assembly (1) according to claim 1, wherein at least 80 volume percent of the carriage includes a fiber reinforcement.

9. A method for producing a carriage (20) comprising a carriage body region and a sliding element region as a one-piece carriage part for the plain bearing assembly (1) according to claim 1, the method comprising processing components of the tribopolymer and reinforcement fibers in a multicomponent injection molding method in such a manner that allows for the reinforcement fibers in the tribopolymer to be concentrated away from the inner side of the cylindrical passage (22).

10. A carriage (20) for a plain bearing assembly (1), the plain bearing assembly (1) having a rail with a cylindrical guide portion, a neck portion, and a rail body connected to the cylindrical guide portion via the neck portion, the rail having a rail body (10) elongated in a longitudinal direction, the rail body (10) having a transverse side running in the longitudinal direction and bounding the rail body in a transverse direction, the transverse direction being perpendicular to the longitudinal direction, the carriage (20) being produced as a one-piece carriage part of plastic sliding material, the carriage part having a carriage body region and a sliding element region integrally formed with the carriage part, wherein a cylindrical passage (22) corresponding to the cylindrical guide portion (11) is provided in the carriage body region for receiving the cylindrical guide portion (11), wherein the carriage body region has a longitudinal slot (26) for receiving the neck portion (13), which slot (26) is connected to the cylindrical passage (22), wherein an inner side of the cylindrical passage (22) is formed by the sliding element region, with which, in an operating state of the plain bearing assembly (1), the carriage (20) rests slidingly in the longitudinal direction against the cylindrical guide portion (11), and wherein the carriage (20) has a mounting side for receiving a machine component which is to be moved in a longitudinal direction along the rail body (10) and the carriage (20) has a fastening channel which runs through the carriage body region perpendicularly to the longitudinal direction and opens into the mounting side, wherein the fastening channel is spaced from the cylindrical passage by an offset in the transverse direction, wherein the carriage is produced in one piece and comprises a tribopolymer material.

11. The carriage (20) according to claim 10, wherein the carriage (20) has a width of 20 mm to 40 mm, a length of 20 mm to 50 mm and a height of 10 mm to 25 mm and weighs less than 20 g, and in at least one load direction has a static load-carrying capacity of at least 20 N.

12. A plain bearing assembly (1) comprising a rail and a carriage (20), wherein the rail has a rail body (10) elongated in a longitudinal direction, the rail body (10) having a transverse side running in the longitudinal direction and bounding the rail body in a transverse direction, the transverse direction being perpendicular to the longitudinal direction, wherein a cylindrical guide portion (11) is provided at the transverse side of the rail body, the cylindrical guide portion being connected to the rail body (10) via a neck portion of the rail, wherein the carriage (20) has a carriage body region (24) in which a cylindrical passage (22) corresponding to the guide portion (11) is provided for receiving the guide portion (11), wherein the carriage body region has a longitudinal slot (26) for receiving the neck portion (13), the slot (26) is connected to the passage (22), wherein an inner side of the passage (22) comprises a sliding element region (25), with which, in an operating state of the plain bearing assembly, the carriage (20) rests slidingly in the longitudinal direction against the guide portion (11), wherein the carriage body region (24) and the sliding element region (25) is are made in one piece of a plastic sliding material, wherein at least 80 volume percent of the carriage (20) includes a fiber reinforcement and wherein the carriage body region (24) has a higher fiber content than the sliding element region (25).

13. The carriage (20) according to claim 12, wherein the carriage (20) has a width of 20 mm to 40 mm, a length of 20 mm to 50 mm and a height of 10 mm to 25 mm; weighs less than 20 g; and in at least one load direction has a static load-carrying capacity of at least 20 N.

14. The carriage (20) according to claim 10, wherein the carriage (20) has a width of 20 mm to 40 mm, a length of 20 mm to 50 mm and a height of 10 mm to 25 mm; weighs less than 15 g; and in at least one load direction has a static load-carrying capacity of at least 20 N.

15. The plain bearing assembly (1) according to claim 12, wherein the guide portion (11) is produced from a metal or a metal alloy.

\* \* \* \* \*